May 5, 1953 G. T. KODAMA 2,637,778

TONE COMPENSATED VOLUME CONTROL

Filed Oct. 20, 1950 2 SHEETS—SHEET 1

INVENTOR.
GEORGE T. KODAMA

BY [signature]

HIS ATTORNEY.

TONE COMPENSATED VOLUME CONTROL

Filed Oct. 20, 1950 2 SHEETS—SHEET 2

INVENTOR.
GEORGE T. KODAMA
BY Arthur G. Connolly
HIS ATTORNEY

Patented May 5, 1953

2,637,778

UNITED STATES PATENT OFFICE 2,637,778

TONE COMPENSATED VOLUME CONTROL

George T. Kodama, Dunstable, Mass., assignor to Sprague Electric Company, North Adams, Mass., a corporation of Massachusetts Application October 20, 1950, Serial No. 191,108

10 Claims. (Cl. 178—44)

This invention relates to tone-compensated volume controls, and more particularly to such volume controls for signal reproducing systems such as those used in radio and television receivers and sound record reproducers.

The characteristics of the human ear are such that the apparent loudness of low-frequency tones relative to middle and high frequnecy tones decreases as the absolute signal intensity is reduced. In order to compensate for this effect, volume controls are sometimes arranged so that as the volume control reduces the audible signal output, the reduction in the higher frequency range is more than that of the low-frequencies. Such volume controls are known as tone-compensated volume controls and are also desirable because they give better results in locations having poor acoustic characteristics, and they reduce the effects of hiss, scratch, or the other high frequency noise in the output of sound reproducers to which they are attached. In fact practically all quality radio and television receivers are provided with tone-compensated volume controls.

Although tone-compensated volume control circuits are well known and of proven merit, the cost of such circuits has been excessive, by reason of the large number of resistors and capacitors required. This has heretofore prevented the use of these circuits in the majority of manufactured equipment.

One of the objects of this invention is to provide a tone-compensated volume control that is inexpensive to make and incorporated in standard equipment. Further objects will become obvious from the description and claims that follow.

The present invention provides an integral tone-compensated volume control. The control includes circuit elements produced in accordance with printed electronic circuit techniques, and is of compact, inexpensive construction.

The invention will be more fully described with reference to the appended drawings wherein.

Figure 1:
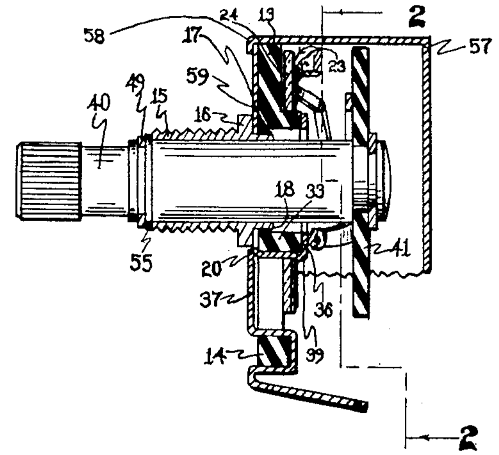
Fig. 1 is a sectional view of one embodiment of the tone-compensated volume control of the invention, taken along line 1—1 of Fig. 2.
Figure 2:
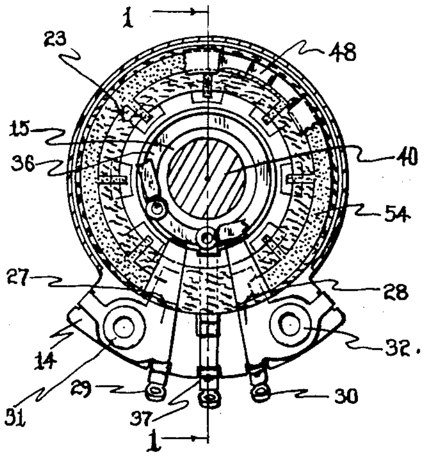
Fig. 2 is a transverse section along line 2—2 of the construction of Fig. 1.

Referring particularly to Figs. 1 and 2, a substantially circular dielectric plate 13 with an extension 14 projecting from one portion has a central aperture through which is fitted a bushing 15 with a plate-supporting flange 16. The bushing is crimped in place as by deforming its inner end 18 outwardly against a ledge 17 in the portion of the plate bounding the aperture. The bushing is externally threaded to receive a nut (not shown) by which the entire structure may be mounted on a support (not shown) in the conventional manner.

A flat ceramic disc 23, the faces of which carry the printed tone-compensated circuit (see Figs. 2–11) is mounted on one side of the plate 13. The nature of the printed circuit structure will be particularly described with reference to the suitable figures. Disc 23 which is in the shape of a ring, is fitted over a flange 33 which projects up from around the bushing aperture.

A conducting contact ring 36 is held on the flange 33 concentrically with the bushing 15, and has a radial arm 37 interlocked in a slot in dielectric extension 14 to keep the ring in position. A notch 19 in ceramic disc 23 is engaged by arm 37, and a retaining nib or kink 20 can be formed in the arm to clamp the ring against the flange 33. The ring and its arm 37 form one terminal for the volume control member.

A rotor member comprises a shaft 40 rotatably fitted through bushing 15 and having a split and/or splined outer end as is usual for receiving an operating knob (not shown). The other end of the shaft 40 has fixed thereon a disc 41 of insulating material which carries a slidable contact member generally designated as 45 (see Fig. 7). This member is formed with a pair of symmetrically disposed resilient contact fingers 46 slidable on the contact ring 36, and with a resilient arm 47 having a contact knob 48 at its mid-point to slidably engage a suitable portion of the circuit on the ceramic ring 23. The contact elements press against the surfaces they engage, and urge the shaft 40 to the right as seen in Fig. 1, but such movement of the shaft is prevented by a split snap ring 49 held in a groove in the shaft and engaging a washer 55 between it and the bushing.

Figure 3:
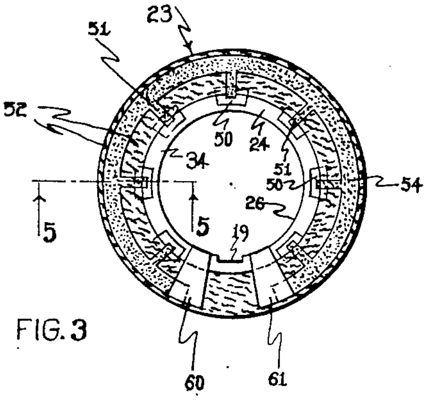
Fig. 3 is a plan view of the stator element of the construction of Figs. 1 and 2.

The printed circuit element 23, as shown in Figs. 1–5 is shown as a coated high dielectric constant ceramic disk 24 having a central aperture 26 therein. As shown in Figs. 2 and 3, one face 34 of disk 24 has spaced conductive coatings 50 radially distributed thereon. The coatings are metallic (generally silver) and are formed on and bonded with the dielectric by any suitable method such as those described in National Bureau of Standards Circular 468 entitled "Printed Circuit Techniques," particularly pages 5 to 14. A portion of these coatings together with an adjacent annular sector of dielectric disk 24 is covered with an enamel layer 52 along the outer portions of which is disposed a sector of an annularly shaped electrically resistive coating 54. Such a resistive coating can also be applied in any suitable manner such as those described in the above-mentioned circular, particularly pages 5 to 16. The individual conductive coatings 50 are separately electrically connected to spaced portions of resistive coating 54 by means of resistive coating strips 51 which extend from arcuate coating 54 over enamel 52. Resistive coating strips 51 can be of the same or different composition as resistor element 54, if desired, and can be painted or printed upon the ceramic, enamel or metallic coatings at the same time or in successive steps. Metallic terminal coatings 60, 61 (see Fig. 3), preferably of silver, are applied over the ends of resistor element 54 and extend over and upon the other face 35 of printed circuit element 23.

Figure 4:
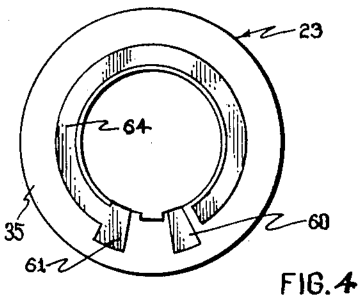
Fig. 4 is a plan view of the opposite face of the stator element shown in Fig. 3.
Figure 5:
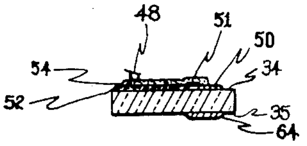
Fig. 5 is a sectional view taken along line 5—5 of Fig. 3.

This other face 35 as shown in Figs. 4 and 5 has a metallic coating 64 similar in composition to coatings 50 and in capacitive relationship therewith. One end of resistive coating 54 and the corresponding end of conductive coating 64 are electrically connected by means of terminal coating 61 as shown in Fig. 4, while the other ends of these coatings are left unconnected. The terminal coatings 60, 61 on face 35 are separately held against conductive terminal strips 27, 28 fastened to dielectric extension 14 as by eyelets 31, 32. An additional spring-like nib or kinked portion 39 of member 37 tends to compressively retain printed circuit element 23 against dielectric plate 13.

Figure 6:
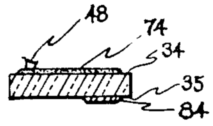
Fig. 6 is a sectional view similar to Fig. 5 of an alternative stator structure in accordance with the invention.

A modification of the above structure is shown in Fig. 6. Here a resistive coating 74 takes the place of coatings 50, 51, 52 and 54 and acts both as a resistor element and as a series of capacitor plates for capacitive cooperation with conductive coating 84. If desired the coating 74 may have individual capacitive portions directly opposite coating 64 separated from each other and connected by radially extending interconnected arms to more closely duplicate the structure of Fig. 3. In either modification contact knob 48 provides a slidable electrical contact with resistor element 54 or the non-capacitive, outer extremity, of resistor-capacitor element 74 and connects through contact member 45 to fixed contact ring 36. By moving contact knob 48 over the surface of resistor element 54 or resistor-capacitor element 74 it is possible to tap off part of the resistor capacitor circuit and thus to supply varying portions of the signal voltage appearing between the ends of resistive coating 54.

The volume controls of the present invention are preferably enclosed in a casing or cover 57 having ears 58 which, as shown in Fig. 1, may be bent over and engaged against a metallic plate 59 held between dielectric plate 13 and bushing 16. The plate 59 may be held against rotation as by a non-circular central aperture engaging a correspondingly shaped portion of the bushing. A notch may also be provided in plate 59 for receiving each ear 58 to prevent rotation of the casing. The enclosed parts are thus protected from damage and shielded against interfering electrical and/or magnetic disturbances.

Figure 8:
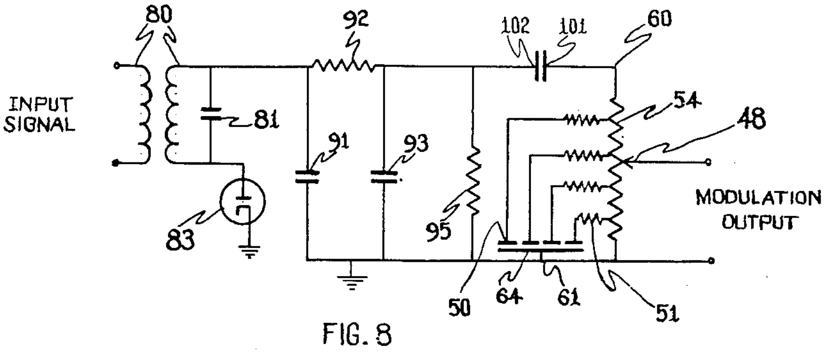
Fig. 8 is a fragmentary diagram of a portion of a radio receiver circuit showing the tone-compensated volume control circuit in which the control of the invention can be used.

The diagram shown in Fig. 8 illustrates a manner for using the volume control of the present invention in the circuit of a standard type of radio receiver. The input signal is received in the primary of transformer 80 the secondary of which is tuned to the intermediate or heterodyne frequency by means of capacitor 81. This intermediate frequency signal which is modulated by audio signals at a much lower frequency is then demodulated by means of grounded diode detector 83 connected to one lead of the transformer's secondary winding. The modulated signal then passes through the filter network 91, 92, 93 to the load resistor 95 from which it is capacitively coupled to the tone-compensated volume control of Fig. 1. The circuit elements are numbered to correspond with the previously described structures. The modulated output frequency is fed from the tone-compensated volume control tap 48 to an audio amplifier stage. Both the radio and tone-compensated volume control circuits are well known to the art and they will not be discussed further except to say that with load resistors having an impedance of ½ to 2 megohms, the resistive coating 84 can have a corresponding impedance, the resistive links 51 about one-tenth that impedance, and the individual capacitors 50—64 may use a barium-strontium titanate disc having 15 to 25% barium titanate and about 12 to 18 thousandths of an inch thick, with an effective electrode area of about 0.1 to 0.3 square centimeter.

Figure 10:
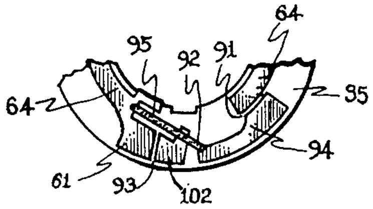
Figs. 9 and 10 are fragmentary plan views similar to Figs. 3 and 4 of a modified stator member exemplifying the invention.
Figure 9:
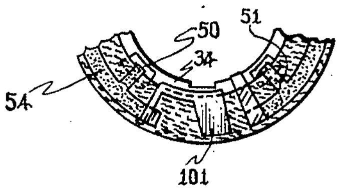

Figs. 9 and 10 show a modified form of volume control according to this invention wherein many of the circuit elements of Fig. 8 are integrally incorporated by adding conductive coatings 94, 102 and resistor strip 92, 95 to face 35 of printed circuit element 23, and conductive coating 101 to the other face 34. Capacitance 91 is provided by edge effect between adjacent coatings 64, 94. Resistor strip 92, 95 provides the resistances shown. Capacitance 93 is provided by edge effect between coating 102, and the terminal 61 of coating 64, and the coupling capacitor is provided by means of opposed coatings 101, 102. The edge effect capacitances can be increased or decreased by suitable modification of the coatings. Thus by increasing the length of coating 94, capacitance 91 can be readily increased. Correspondingly, of the coating terminal 61 and coating 102 forming capacitor 93, either can be provided with extensions positioned closely adjacent the other to increase the capacitance. The one not extended can be shortened somewhat to make more room for the extension. Circuit connections are completed by contact of terminal strips 27, 28 with coatings 94, 61 respectively.

Figure 7:
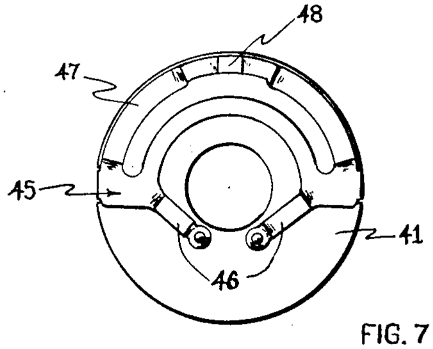
Fig. 7 is a plan view of the rotor member used in the embodiment of the invention shown in Fig. 1.

The remainder of the volume control can be as shown in connection with either Figs. 3 or 7.

Figure 11:
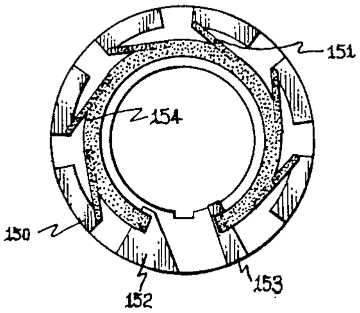
Fig. 11 is a plan view similar to Fig. 3 of a further type of stator member embodying the present invention.

Fig. 11 is a further exemplification of the invention in which the separate capacitor electrodes 150 are located radially outside of the resistive coating 154, and the resistive links 151 are arranged in a non-radial direction so as to have increased length. This not only provides more room for electrodes 150 thereby enabling larger capacitors, but reduces the need for an insulating layer to provide a nonconductive support for long links 151. Links 151 can accordingly have a substantial width and can be more readily applied as by the conventional silk-screening technique described in the above-identified circular.

In this construction, the opposing ground return coating on the other face of the disc is at the peripheral portion of the disc aligned with coatings 150. The terminals of resistive coating 154 are shown at 152, 153, coating 153 being continued over to the reverse face where it becomes ground return terminal 61 as in Fig. 4. Terminal 152 does not continue over to the other face but is in capacitive relation with a correspondingly positioned coating (not shown) on that other face to provide an input capacitance as shown at 101, 102 in Fig. 8. This modification of the invention can be used with a separate load resistor corresponding to resistor 95 of Fig. 8.

To further lengthen the resistive strips 151, they can be shifted so that they extend from the outer margins of the individual capacitor electrodes 150 between the individual capacitors to the section 154.

If desired, the dielectric disc can be of solid rather than annular construction, as by merely arranging the disc on the opposite side of the inner end of rotor shaft 40, with the contact knob 48 correspondingly relocated. This provides even more room on which the individual capacitor electrodes 50 and 150 can be carried. In addition, a solid disc is somewhat simpler to manufacture than the annular or ring shaped one shown in Fig. 3.

The integral tone compensated volume control unit of the present invention need not be used only in circuits of the type shown in Fig. 8 above. Thus for example filter capacitor 91 can be omitted, and if desired the entire filter network 91, 92, 93 need not be used. According to further modifications the load resistor 95 can also be omitted, in which case the direct current circuit of diode 83 should be completed as by shifting capacitor 101, 102 from the volume control input line to the output line connected to tap 48. This latter type of construction can be conveniently embodied in the integral unit of the invention as by severing lead arm 37 and overlapping the severed ends in capacitive relationship on opposite sides of a dielectric such as plate 13. Alternatively contact ring 36 can be replaced by a correspondingly positioned coating on ceramic disc 24, this coating being capacitively aligned with a coating on the opposite face of the disc which opposite coating can be mechanically engaged with a fixed contact strip similar to those shown at 27 and 28.

Briefly, the tone-compensated volume control operates as follows. As the volume is lowered by tapping the desired signal off a shorter length of resistor element 54, the capacitances 50, 64 effectively become larger portions of the signal load provided by the resistors 54, 41 and these capacitors. At the lower frequencies these capacitors are of little effect but the higher frequencies are appreciably attenuated. Thus as the volume control reduces the gain, the reduction is less for lower frequencies than for higher frequencies.

The required values of resistance and capacitance of the tone-compensated volume control circuit are merely a matter of design and may be varied from those given above by changing the relative dimensions, the relative positions, or the composition of the ceramic, as well as the specific resistivity of the conductive and resistive coatings.

As many apparently widely different embodiments of this invention may be made without departing from the spirit and scope hereof, it is to be understood that this invention is not limited to the specific embodiments hereof except as defined in the appended claims.

What is claimed is:

1. In a tone compensated volume control: a ceramic disc having on one face an elongated arcuately shaped resistive coating extending more than halfway around this face, and a plurality of separate electrically conductive coating portions spaced from but separately resistively connected to portions of the resistive coating and on the other face of the disc an integral electrically conductive coating in effective capacitive relationship with all the spaced coatings, a pair of fixed contact members separately connected to each end of said resistive coating, one of said fixed contact members being also connected to said integral conductive coating and a pivoted contact member physically movable into electrical connection with any desired portion of said resistive coating.

2. In a tone-compensated volume control: a ring-shaped ceramic disc having on one face an arcuately shaped electrically resistive coating, spaced capacitor electrode coating radially displaced from but separately resistively connected to spaced portions of the resistive coating, and on its other face an arcuately shaped capacitor electrode coating in effective capacitive relationship with the spaced electrode coatings; fixed contact members separately connected to the ends of said resistive coating one of the fixed contact members being also electrically connected to said arcuately shaped capacitor electrode coating, a rotor structure extending through said ceramic ring and having a movable contact member electrically connected to wipingly engage said resistor strip; and fixed electrical terminal elements separately connected to all of said contact members.

3. In a tone-compensated volume control: a ring-shaped ceramic disc having arcuately disposed around one face a series of spaced capacitor electrode coatings, an annular insulating coating layer covering at least a portion of each electrode coating, an elongated arcuate electrically resistive coating radially spaced resistive coating elements from the series of electrode coatings on the insulating layer and electrically connecting said spaced capacitor electrode coatings separately to spaced portions of the arcuate resistive coating and on the other face of the disc an arcuately shaped capacitor electrode coating in effective capacitive relationship with the spaced electrode coating; fixed contact members separately connected to the ends of said resistive coating one of the fixed contact members being also electrically connected to said arcuately shaped capacitor electrode coating, a rotor structure extending through said ceramic ring and having a movable contact member electrically connected to wipingly engage said resistor strip; and fixed electrical terminal elements separately connected to all of said contact members.

4. In a tone-compensating volume control unit for supplying any portion of an incoming signal and automatically compensating the supplied portion against the variation in the tonal emphasis of the human ear with respect to intensity; a disc of high dielectric constant alkaline earth titanate ceramic, an elongated wide electrically resistive coating on one surface of the disc, an elongated electrically conductive coating on the other surface of the disc and overlapping only a portion of the width of the resistive coating to establish a corresponding distributed capacitance, a movable contact top held for selectable engagement with limited portions of an elongated section of the resistive coating spaced from the overlapped portion to insert resistive connections between the tapped width of the resistive coating and the distributed capacitance, and a pair of terminals connected to the respective ends of the resistive coating, one of said terminals being also connected to the conductive coating.

5. In a tone-compensating volume control: a dielectric base plate having on its opposite faces a row of pairs of opposed electrode coatings each pair forming a separate capacitance unit, the electrodes on one face being conductively connected in common, and the electrodes of the other face being resistively connected by resistive coating portions to spaced portions of a continuous elongated resistive base plate coating spaced from the capacitor units, a first fixed terminal member electrically connected to one end of said resistive coating, a second fixed terminal member electrically connected to the other end of said resistive coating and to the common capacitor electrodes, and a movable contact member electrically connected to and physically movable along said resistive coating to provide an adjustable tone-compensated volume controlling potentiometer tap for signals carried by the resistive coating.

6. The combination as defined by claim 5 in which the base plate includes additional coatings connected to form a high frequency by-passing filter assembly and a signal supply capacitance both in series with the elongated resistive coating, and a load resistor in parallel to the elongated resistive coating.

7. The combination of claim 5 in which the capacitor electrodes opposing the common electrode are sections of the electrically resistive coating portions.

8. The combination of claim 5 in which the capacitor electrodes opposing the common electrode are electrically conductive coatings different from the electrically resistive coating portions.

9. The combination of claim 5 in which the base plate includes additional coating elements connected to form a high frequency by-passing filter connected to the first fixed terminal.

10. The combination of claim 5 in which the base plate includes additional coating elements connected to form a coupling capacitor connected to the first fixed terminal.

GEORGE T. KODAMA.

References Cited in the file of this patent

UNITED STATES PATENTS

| Number | Name | Date |
|---|---|---|
| 2,037,785 | Holst | Apr. 21, 1936 |
| 2,121,091 | Maginnis | June 21, 1938 |
| 2,464,377 | Cohen et al. | Mar. 15, 1949 |
| 2,474,988 | Sargrove | July 5, 1949 |
| 2,523,856 | Baker | Sept. 26, 1950 |